(12) United States Patent
Chen (10) Patent No.: US 6,463,053 B1
(45) Date of Patent: Oct. 8, 2002

(54) VOICE-AND-FAX-OVER IP DIALING PLAN

(75) Inventor: Xiao L. Chen, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/201,997

(22) Filed: Dec. 1, 1998

(51) Int. Cl.[7] .......................... H04L 12/66; H04L 12/28
(52) U.S. Cl. ........................................ 370/352; 370/401
(58) Field of Search ................................ 370/352, 353, 370/354, 355, 356, 401

(56) References Cited

U.S. PATENT DOCUMENTS

| | | | | |
|---|---|---|---|---|
| 5,995,607 A | * | 11/1999 | Beyda et al. | 379/202 |
| 6,069,890 A | * | 5/2000 | White et al. | 370/352 |
| 6,075,783 A | * | 6/2000 | Voit | 370/352 |
| 6,147,971 A | * | 11/2000 | Rochberger et al. | 370/238 |
| 6,253,249 B1 | * | 6/2001 | Belzile | 709/249 |
| 6,292,478 B1 | * | 9/2001 | Farris | 370/352 |
| 6,304,565 B1 | * | 10/2001 | Ramamurthy | 370/352 |
| 6,324,280 B2 | * | 11/2001 | Dunn et al. | 379/230 |

FOREIGN PATENT DOCUMENTS

| | | |
|---|---|---|
| EP | 0848560 | 6/1998 |
| EP | 0907280 | 4/1999 |
| WO | WO 98/48542 | 10/1998 |
| WO | WO 99/29123 | 6/1999 |

* cited by examiner

Primary Examiner—Wellington Chin
Assistant Examiner—Brenda Pham
(74) Attorney, Agent, or Firm—Thomas A. Gigliotti; Bracewell & Patterson, L.L.P.

(57) ABSTRACT

A method for a user of telecommunication services to dynamically interchange routing paths between a carrier network circuit and the Internet for connecting to a destination. A user code is allocated which marks a connection request as requesting switching/routing via an IP network. When the code is detected by a carrier switch, the call connections are routed through the IP network. The user is provided with the option of terminating the IP network connection and selecting carrier network connection without call interruption.

29 Claims, 10 Drawing Sheets

| Calling party number (402) | Calling party number (404) | TID (406) |
|---|---|---|
| | | |

VOICE-AND-FAX-OVER IP DIALING PLAN

BACKGROUND OF THE INVENTION

1. Technical Field

The present invention relates generally to a telecommunications network and in particular to a method and system for routing of calls within the telecommunications network. Still more particularly, the present invention relates to a method and system for routing of calls within a telecommunications network via the Internet.

2. Description of the Related Art

Recent advances in technology have resulted in unprecedented growth and diversification in the field of telecommunications. Telecommunications systems long utilized for transmitting voice signals between telephones are now being implemented in a wide variety of other applications. Such applications include, for example, the transfer of information between Local Area Networks (LANs) and the transmission of documents via facsimile. The wide variety of available telecommunications applications has resulted in a marked increase in the utilization of telecommunications systems.

Telecommunications system utilization has also increased as a result of the greater number of telephone devices now available. With the advent of devices such as portable and cellular telephones, more people spend a greater amount of time in telephonic communication than in the past.

These factors have contributed to a general increase in the utilization of telecommunications systems and, in particular, to an increase in the utilization of telecommunications systems for sending long distance and international transmissions. The dramatic social and economic changes which the world has undergone in the past several years have also resulted in the increased utilization of long distance and international telecommunications systems. The current socioeconomic climate of the world suggests that the number of long distance and international transmissions will continue to grow at an increased rate.

The development of computerized information resources, such as the "Internet" and the proliferation of "Web" browsers allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television. In Internet Protocol (IP) telecommunications, a set of computer networks which are possibly dissimilar from one another are joined together by "gateways" that handle data transfer and the conversion of messages from the sending network to the protocols utilized by the receiving network, with packets if necessary. A gateway is a device utilized to connect dissimilar networks (i.e., networks utilizing different communication protocols) so that electronic information can be passed from one network to the other. Gateways transfer electronic information converting such information to a form compatible with the protocols utilized by the second network for transport and delivery. The term "Internet" is an abbreviation for "internetwork," and refers commonly to the collection of networks and gateways that utilize the TCP/IP suite of protocols, which are well-known in the art of computer networking. TCP/IP is an acronym for "Transport Control Protocol/Internet Protocol," a set of software protocol developed by the U.S. Department of Defense for communication between computers.

A quickly developing utilization of the Internet is for the transmission of real-time services such as voice (VoIP) and fax (FoIP). The H.323 [H.323 v2] standard has been proposed to do call control (i.e., make connections) of real-time service on IP networks. This allows end-points or terminals wanting to make connections to negotiate bandwidth and coding requirements before the connection is established. In this standard there are three key players collectively known as nodes:

End-point: These are terminals which need to make connections. They request the connect through a gatekeeper (if one is on the network) and they also negotiate the connection parameters;

Gatekeeper: These entities do bandwidth control (on LANs) and routing of connection packets towards the destination terminal;

Gateway: This entity can be thought of as a collection of end-points, but these entities also translate from other bearer protocols (such as TDM) to the IP protocol.

The market for Internet access and related applications is explosive and is growing faster than expected, doubling in size approximately every three months. IP networks is technology driving the Internet. Most PCs now utilize TCP/IP as their networking protocol. User Datagram Protocol (UDP) is utilized within TCP/IP to convert data messages generated into packets to be sent via IP. However, UDP does not verify that messages have been delivered correctly.

The kinds of traffic running over IP networks is of two major types:

Elastic traffic or non-real-traffic which is primarily data file transfer. Most of this traffic utilizes TCP as its transport level protocol and it can withstand delay quite well, but any corruption of data must be re-transmitted; and The inelastic or real-time traffic is interactive voice, video or data-conferencing. This kind of traffic does not withstand delay well since late information in an interactive session is of no use. This kind of traffic utilizes real time protocol (RTP) over UDP as the transport protocol.

There are some benefits and some negatives to routing real-time traffic over an IP network. IP networks provide free routing from source to destination. Traffic routed via an IP network is thus relatively inexpensive in comparison to a carrier circuit network. There is, however, loss in the quality of service over the IP network due to delay variance or jitter at the destination. Additionally, switching traffic via routers on the IP network can introduce delay for real-time services. Users must therefore balance between cost and quality. Often, lower cost determines the users choice since routing via carrier circuit networks is rather expensive. However, customers also like the flexibility and convenience of being able to select the carrier network if the signal quality is unacceptable. This determination is usually made after the call has been routed via the IP network.

Therefore, it would be advantageous to have an improved IP telecommunications system that permits users to select routing of signals via the Internet to reduce user cost. Additionally, it would be advantageous to permit users to balance the cost with the quality of service and provide a method for switching from the carrier network to the Internet and vice-versa without having to first terminate the call from one network and later re-establish it with the other network.

SUMMARY OF THE INVENTION

It is one object of the present invention to provide an improved method and system for a telecommunications network.

It is another object of the present invention to provide an improved method and system for routing of calls within the telecommunications network.

It is yet another object of the present invention to provide an improved method and system for routing of calls within a telecommunications network via the Internet.

The above features are achieved as follows. A method is disclosed for a user of telecommunication services to dynamically interchange routing paths between a carrier network circuit and the Internet for connecting to a destination. A user code is allocated which marks a connection request as requesting routing via an IP network. The carrier switch is modified to detect the user code when it is entered. A call is routed through the IP network when the carrier switch detects this user code.

In accordance with a preferred embodiment of the present invention, the method utilizes modified carrier switches which permit the routing via the Internet upon user request. The carrier switches connect to the Internet via gateways of the IP network. Once a call has been routed through the Internet, the user may decide to switch back to the carrier network circuits if the quality of the Internet connection is unsatisfactory. This switching occurs contemporaneously so that call connection is maintained.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
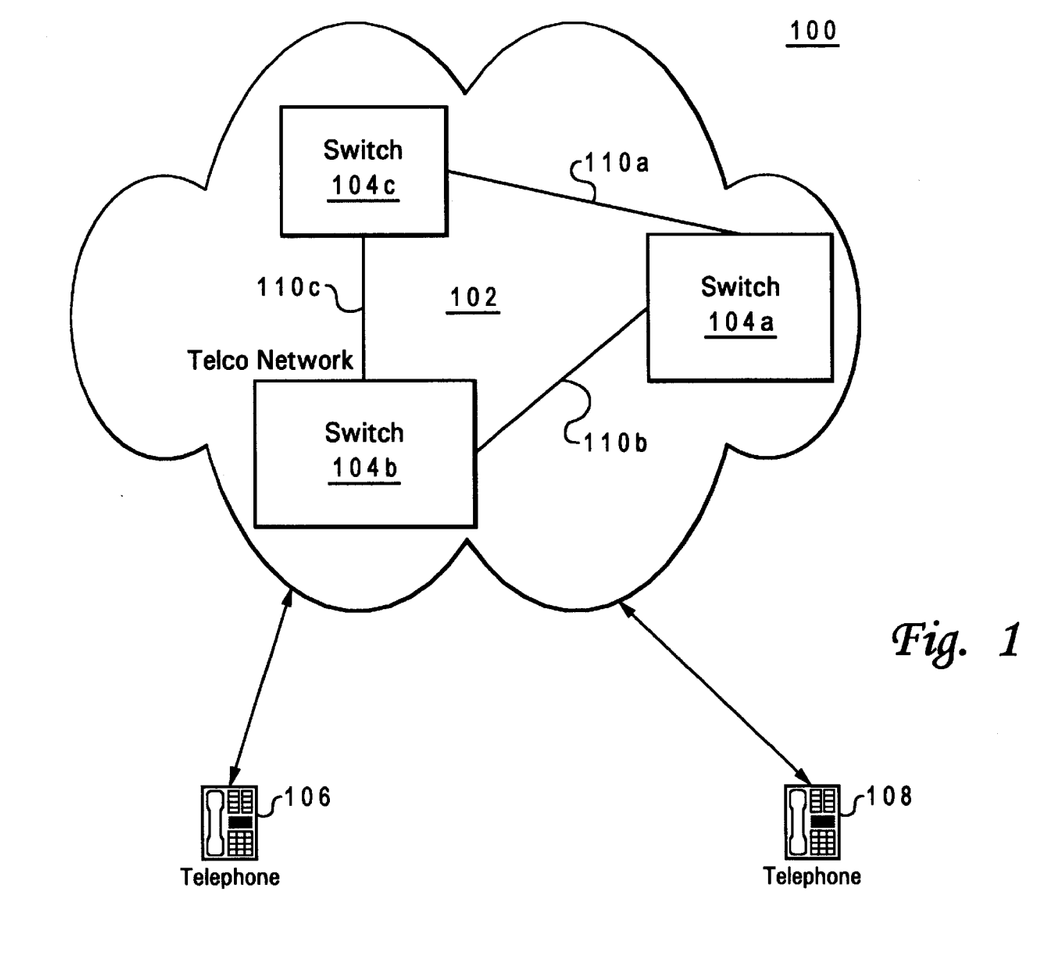
FIG. 1 is a pictorial representation depicting a telephone carrier network according to one embodiment of the present invention.

With reference now to the figures and in particular with reference to FIG. 1, a diagram of a telecommunications system 100 is depicted in which a preferred embodiment of the present invention may be implemented. Telecommunications system 100 in FIG. 1 includes a telecommunications network 102, also called a "Telco Network". Telecommunications network 102 may be, for example, a Local Exchange Carrier (LEC), an Interexchange Carrier (IEC), or a hybrid network. In the case that telecommunications network 102 is in the form of a hybrid network, such a network may include landline and/or wireless telecommunications systems. In the case that a call involves long distance service, the IEC is the service provider for the call within telecommunications network 102. Telecommunications network 102 also includes a number of switches 104a–104c, which provides establishing and routing a call between source Customer Premises Equipment (CPE) 106 and target CPE 108.

Switches 104a–104c interconnect transmission facilities and are employed to route traffic throughout telecommunications network 102. Transmission facilities provide telecommunications paths 110a–110c to carry a user's voice or other transmission data and network control information between switches in a network. Generally, transmission facilities include a medium, such as, for example, air, copper wires, coaxial cables, or fiber optic cables, along with electronic equipment employed to amplify and/or relay signals. CPE, also called subscriber or station equipment, is generally located at a user's premises. The depicted example contains three switches and three telecommunications paths for illustrative purposes only. Depending on the system, other numbers of switches, telecommunications paths, and configurations thereof may be employed. The function of CPE is to transmit and receive user information and exchange control information with telecommunications network 102 to place calls and access services from telecommunications network 102. CPE may be a telecommunications unit, such as, for example, a telephone, a computer, or a fax machine.

The process of the present invention may be implemented in a data processing system within telecommunications network 102. For example, the data processing system may be implemented as a switch or as a computer having a connection to the switch.

Figure 2:
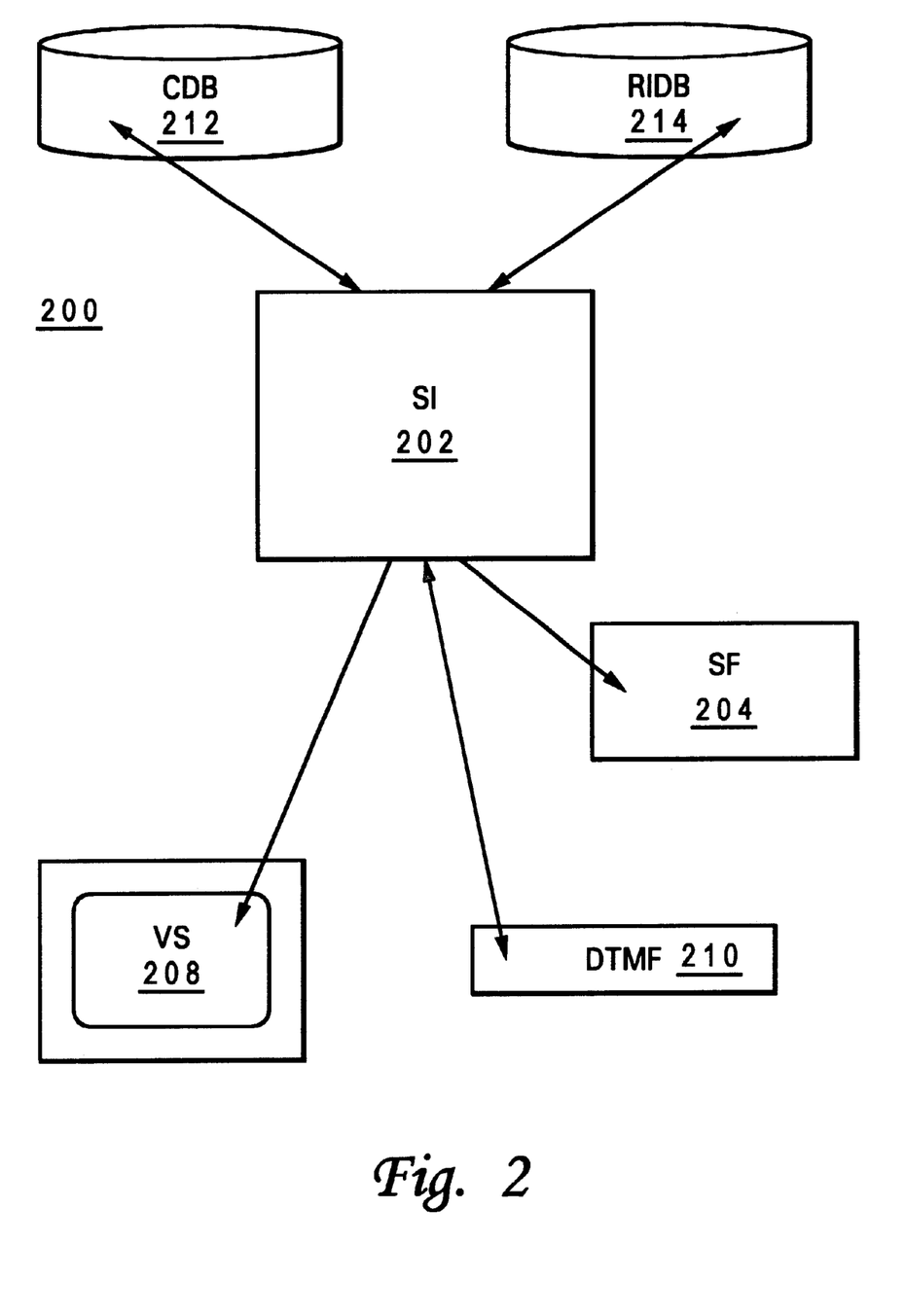
FIG. 2 is a block diagram depicting a data processing system utilized in telecommunications networks in accordance with one embodiment of the present invention.

Turning now to FIG. 2, a functional block diagram of data processing system 200 is depicted in accordance with a preferred embodiment of the present invention. Data processing system 200 is an example of a data processing system in which a preferred embodiment of the present invention may be implemented. In particular, data processing system 200 in FIG. 2 contains hardware that is depicted in functional units in accordance with a preferred embodiment of the present invention. Some of the functional units described below for data processing system 200 may be configured in different physical units depending on the implementation. Examples of physical implementations are described below with reference to FIGS. 3A and 3B.

In FIG. 2, data processing system 200 contains switch intelligence (SI) 202, which includes the logic for call processing and providing pre-call information in accordance with the preferred embodiment of the present invention. In addition, data processing system 200 includes switch fabric (SF) 204, which contains the telecommunications links and other switch hardware utilized to connect callers to the switch and to each other. Voice server (VS) 208 contains multiple independent voice channels or paths for sending messages. In the depicted example, each of the voice channels are referred to as voice ports. For example, voice server 208 may contain three voice ports identified as VP1, VP2, and VP3. Data processing system 200 also includes a dual tone multi frequency (DTMF) detector 210 for detecting DTMF tones that may be transmitted by a user. Depending upon the implementation, voice recognition equipment may be utilized in place of or in addition to DTMF detector 210. Customer database (CDB) 212 is a database containing information on customers utilized to determine charges for calls from a source location to various target locations. Different customers may have different rates in effect based on the particular plan subscribed to by the customer. Additionally, rates also may vary depending on factors, such as, for example, the time at which a call is placed, the geographic location of the calling party and of the called party, currently activated special features, and discounts currently in effect for a particular customer. Depending on the long distance or cellular service selected by the customer and the particular plan chosen, different customers may have different rates even though they initiate calls at the same time of the day to the same geographic location. This customer database may serve as the call log table utilized in accordance with the preferred embodiment of the present invention. Routing information database (RIDB) 214 is a database containing routing information for call processing.

The processes of the present invention may be implemented in a data processing system, such as a switch. The present invention also may be implemented in other data processing systems. For example, the processes of the present invention may be implemented within a computer having a connection to a switch in which the computer provides the logic and commands to the switch to provide the processes utilized to provide post call charge information to a customer.

Figure 3A:
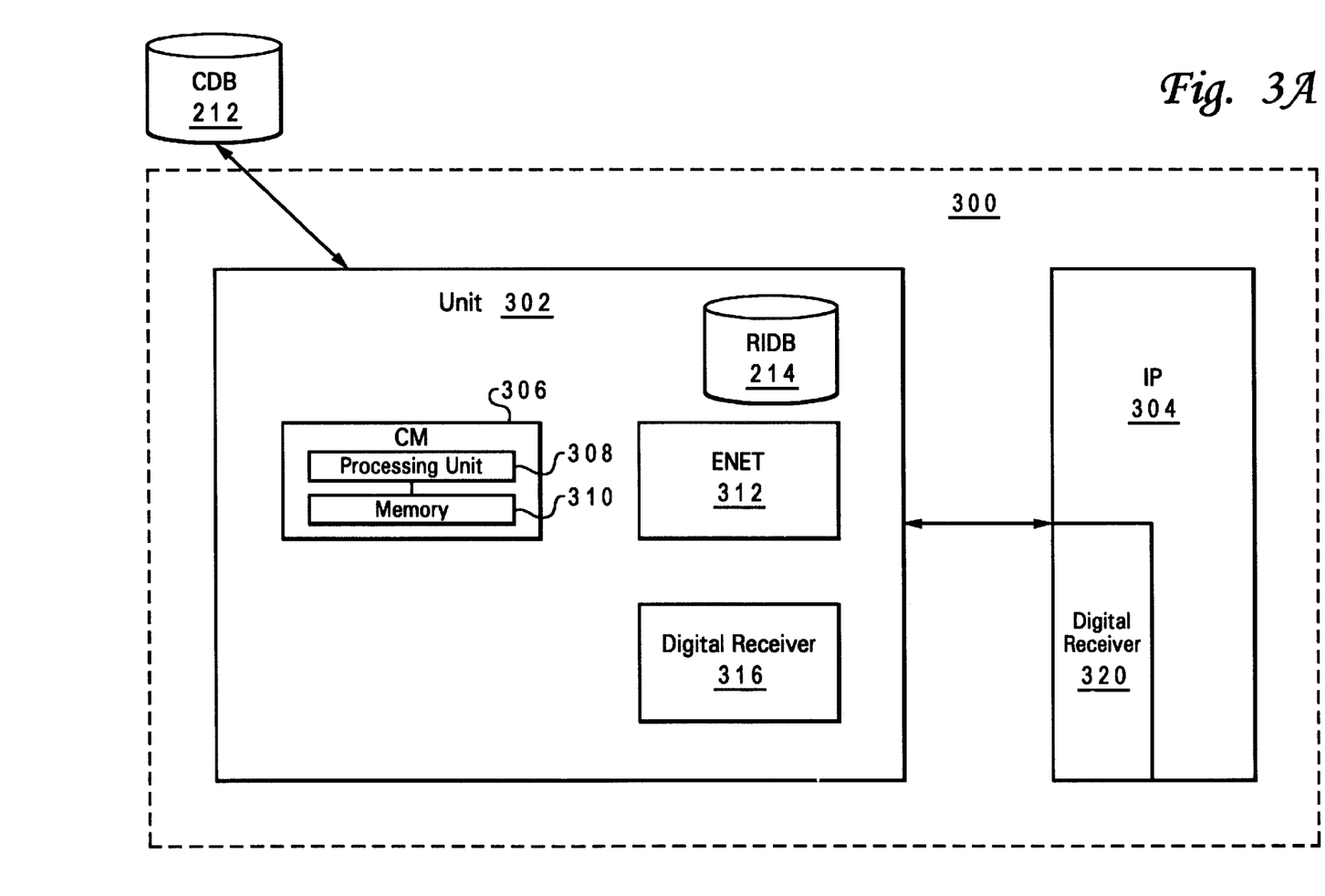
FIG. 3a is a block diagram depicting one embodiment of the physical component of a carrier switch in accordance with the present invention.
Figure 3B:
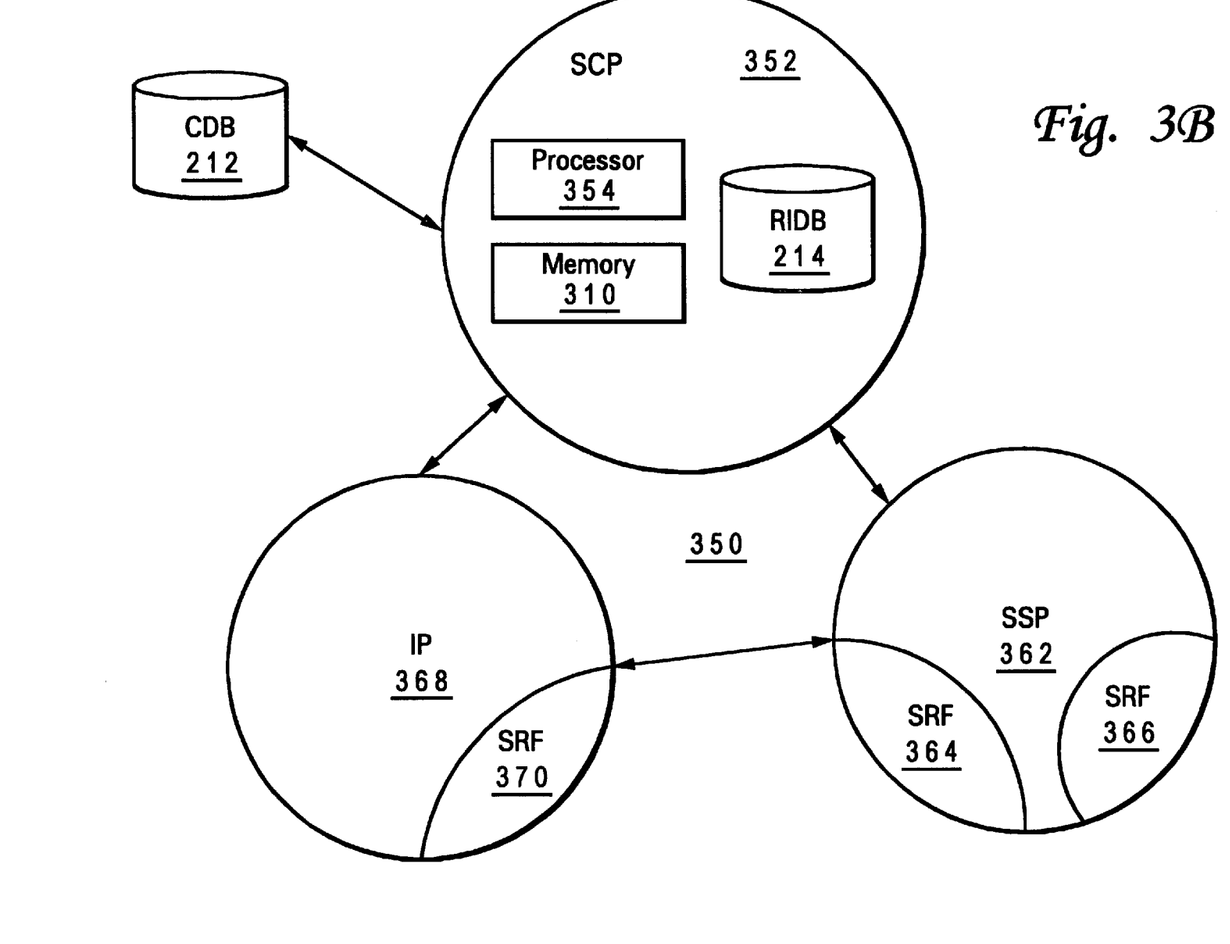
FIG. 3b is a block diagram depicting another embodiment of the physical component of a carrier switch in accordance with the present invention.

Turning now to FIGS. 3A–3B, block diagrams illustrating physical components of switches are depicted in which a preferred embodiment of the present invention may be implemented. FIG. 3A is a block diagram of switch 300, which is representative of the DMS family of switch products available from Northern Telecom. Switch 300 in FIG. 3A may be implemented within telecommunications system 100, in switches such as switches 104a, 104b, or 104c in FIG. 1.

In FIG. 3A, switch 300 includes unit 302 connected to intelligent peripheral 304. Unit 302 contains a computing module (CM) 306, which provides switch intelligent functions for switch 300. Computing module 306 contains processing unit 308 and memory 310. Processing unit 308 may contain, for example, one or more microprocessors for executing instructions to provide logic for call processing and processes for providing post call charge information in accordance with the preferred embodiment of the present invention. Memory 310 stores instructions and data and may include random access memory (RAM) and/or read only memory (ROM).

Unit 302 also includes enhanced network (ENET) 312, which provides a switch fabric function. Digital receiver 316 provides DTMF functions. Unit 302 also contains RIDB 214. Voice server functions are provided by intelligent peripheral (IP) 304. Additionally, intelligent peripheral 304 also contains digital receiver 320. Digital receivers 316 and 320 may provide voice recognition functions in place of or in addition to recognizing DTMF tones.

Switch 300 has a connection to customer database (CDB) 212, which is external to switch 300. Customer database 212 is in communication with unit 302 through enhanced network 312.

Turning now to FIG. 3B, a block diagram of physical components in an intelligent network (IN) 350 is depicted in accordance with the preferred embodiment of the present invention. In the depicted example, intelligent network 350 is representative of an International Telecommunications Union switch defined by ITU-T Q.1200. Intelligent network 350 includes a service control point (SCP) 352, which is the switch intelligence for intelligent network 350. Within service control point 352 is a processor unit 354 and a memory 310. Additionally, service control point 352 also contains RIDB 214. Intelligent network 350 also contains a service switch platform (SSP) 362, which provides switch fabric functions. Specialized resource functions (SRFs) 364 and 366 are found within service switch platform 362. Specialized resource function (SRF) 364 provides DTMF functions for recognizing signals from consumer premises equipment. Intelligent peripheral (IP) 304 also is a part of intelligent network 350 and provides voice server function. Additionally, within intelligent peripheral 368 is specialized resource function 370, which also serves to provide DTMF functions. Alternatively, instead of DTMF functions, specialized resource function 364 and 366 may be employed to provide voice recognition in place of, or in addition to, recognizing DTMF tones. Specialized service control point 352 is in communication with CDB 212, which is external to intelligent network 350.

Figure 4:
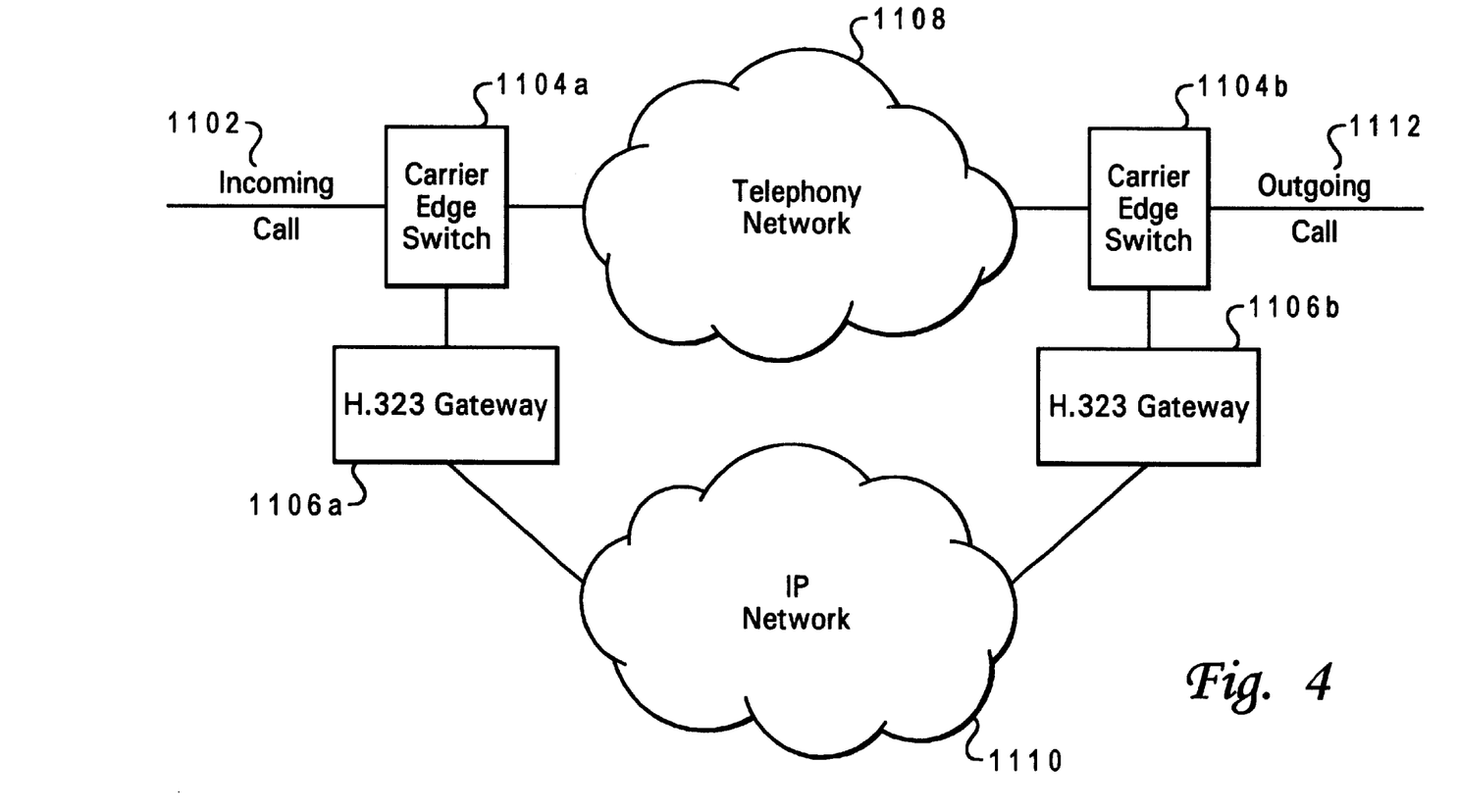
FIG. 4 is a block diagram depicting the network setup in accordance with one embodiment of the present invention.

In order to implement the present invention, the carrier networks is connected to the IP network as depicted in FIG. 4. In the preferred embodiment, the carrier edge switches of the originating point and the destination point are connected to the IP network via H.323 gateways, respectively. FIG. 4 depicts general network setup according to the preferred embodiment of the present invention. Incoming calls 1102 are processed by carrier edge switch 1104a. Carrier edge switch 1104a is a special switching device utilized by carriers to route calls from one point to another as illustrated in FIG. 1. Carrier edge switch 1104a in turn is connected to telephone network 1108 at the origination point. Telephone network 1108 is then connected at the destination end to another carrier edge switch 1104b, which processes the signals received and directs the outgoing call 1112 to its intended destination. According to the preferred embodiment of the present invention, carrier edge switches 1104a and 1104b are also connected to IP network 1110 via H.323 gateways 1106a and 1106b. H.323 gateway 1106a represents the entry node to IP network 1110. H.323 gateway 1106a receives messages from the source routed to IP network 1110.

Carrier edge switch 1104a connected to origination H.323 gateway 1106a routes incoming calls 1102 through IP network 1110. The call is then communicated to destination H.323 gateway 1106b. Destination H.323 gateway 1106b is connected to outgoing carrier edge switch 1104b. Outgoing call 1112 is sent to carrier edge switch 1104b from where outgoing call 1112 is routed to its intended destination.

In an illustrative example of this process, selection of IP network is completed by first identifying a special IP area code and IP country code. The IP area code and country code may either be industry wide standard or proprietary, and is selected so that it is unique. It may be any combination of characters, (for example 999, 9*) except that it may not be a valid area code/country code already in use. In this illustrative embodiment, 999 is selected as the IP area code and IP country code.

In this illustration of the preferred embodiment, when a customer decides to try the IP network for a long distance Voice/Fax call, the dialing plan for domestic long distance call is 1+(IP area code)+(called party area code+called party phone number), and the dialing plan for international long distance call is 011+(IP country code )+(country code+ called party area code+called party phone number). Other methods of selecting the IP network are possible.

Figure 5:
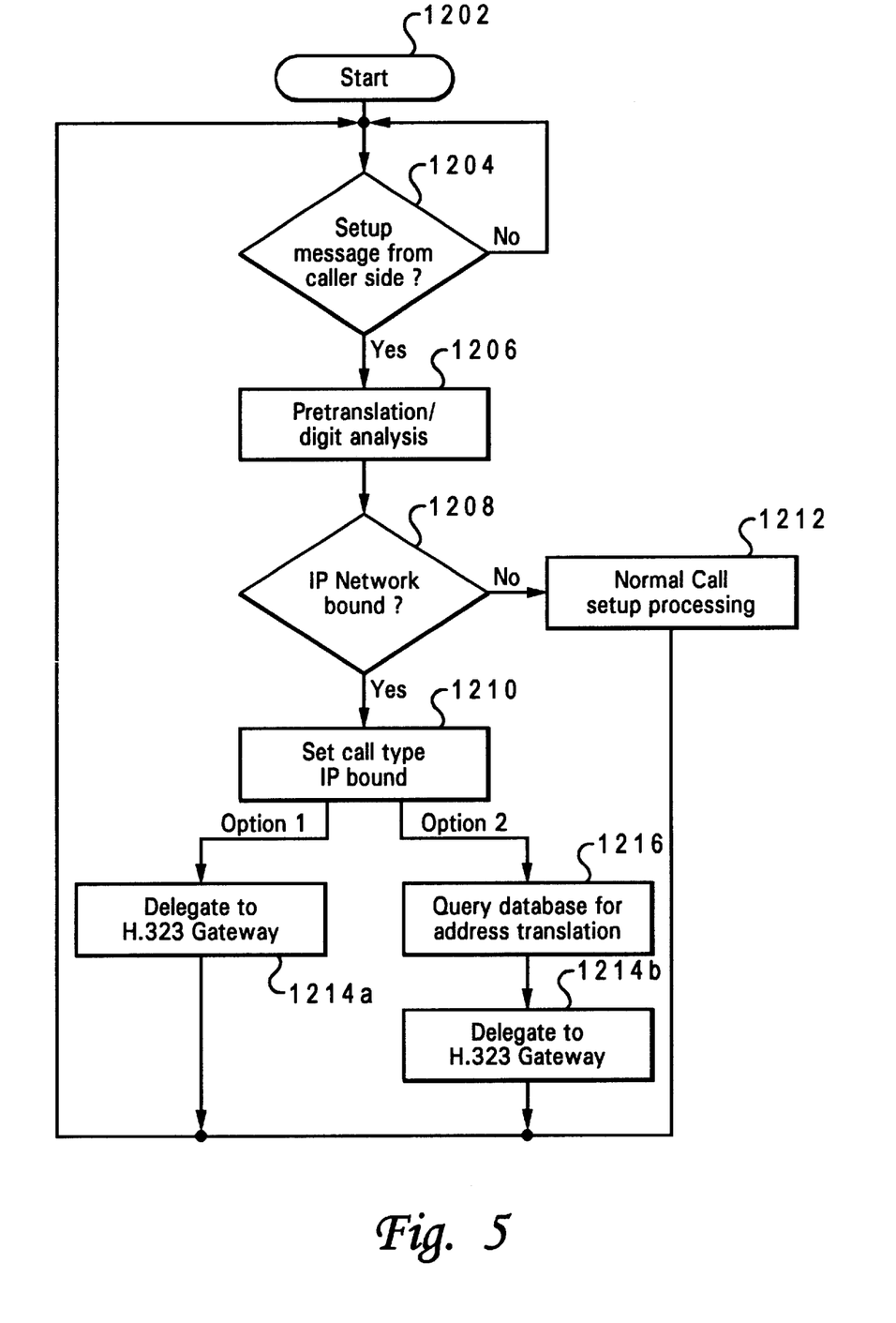
FIG. 5 is a chart depicting the logic flow when the edge switch receives the setup message from the caller in accordance with one embodiment of the invention.

When a call with the above dialing plan from the caller comes to the carrier edge switch (originating side) as shown in FIG. 4, the call flow for setup is as shown in FIG. 5. The call is identified as going through IP network by digit analysis or pretranslation or other means of determining the routing. The IP bound calls are delegated to the H.323 gateway, but the address translation (from the called party phone number to the H.323 gateway attached to the terminating edge switch) is done by querying either the voice network database or the registered H.323 gatekeeper.

FIG. 5 depicts a logic flow diagram which shows the call setup process at the originating edge switch. The process begins when a caller enters a number on origination CPE as illustrated in block 1202. A setup message is received from the caller as illustrated in block 1204. Once this message is received, the message undergoes pretranslation or digit analysis as illustrated in block 1206. This pretranslation or digit analysis from block 1206 determines whether or not the user has entered digits (or a code) which will route the calls through the IP network. The carrier switch determines if the call is IP network bound as illustrated in block 1208. If the call is to be routed through the IP network, then the carrier switch sets the call type as being IP bound as illustrated in block 1210. Once this occurs, one of two options is possible. Option one delegates the call to the H.323 gateway as illustrated in block 1214a. Option two first queries the switch database for address translation as illustrated in block 1216. Then the call is delegated to the H.323 gateway as illustrated in block 1214b. If the call is not IP network bound as illustrated in block 1208, then normal call processing is setup as illustrated in block 1212. The process then returns for the routing of the next call.

Figure 6:
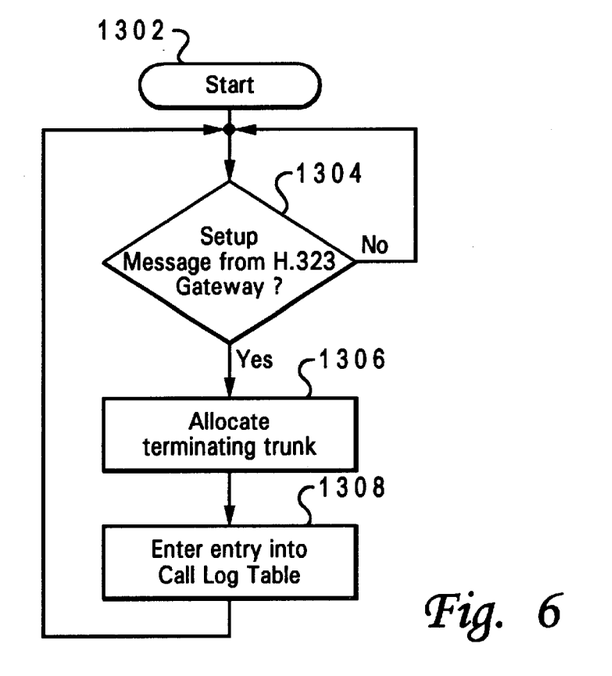
FIG. 6 is a chart depicting the logic flow when the edge switch receives the setup message from the H.323 gateway in accordance with one embodiment of the invention.

FIG. 6 depicts a call setup request from the destination H.323 gateway which is sent to the carrier edge switch at the terminating side of the call. The process starts as illustrated in block 1302. The setup message is received from the H.323 gateway as illustrated in block 1304. Once this message is received, the terminating trunk is allocated as illustrated in block 1306. An entry is then made into the call log table as illustrated in block 1308 to register the call as being routed through the IP network.

Figure 7:
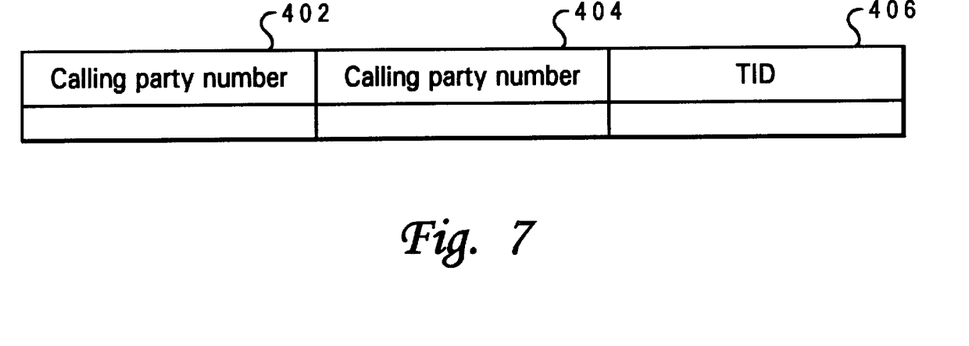
FIG. 7 is an illustration of a call log table in accordance with one embodiment of the invention.

Besides allocating the terminating trunk as a normal call, the carrier switch updates an in-switch call log table as shown in FIG. 7. FIG. 7 shows a single row of data in the call log table. Entered into each row of data is the calling party number 402, called party number 404 and the terminating trunk identifier (TID)406. TID is an in-switch identifier for the outgoing trunk. This table will be utilized later for mid call features.

After the call is answered for a voice call, the digit receiver is reattached for a minute or so in the preferred embodiment. In the preferred embodiment, if the caller is not satisfied with the voice quality, he/she may dial a special key, for example "*", to switch back to the circuit network. When the carrier switch receives the "*" key message, it detaches the receiver, allocates the terminating voice trunk and sends a setup request message over the terminator.

Figure 8:
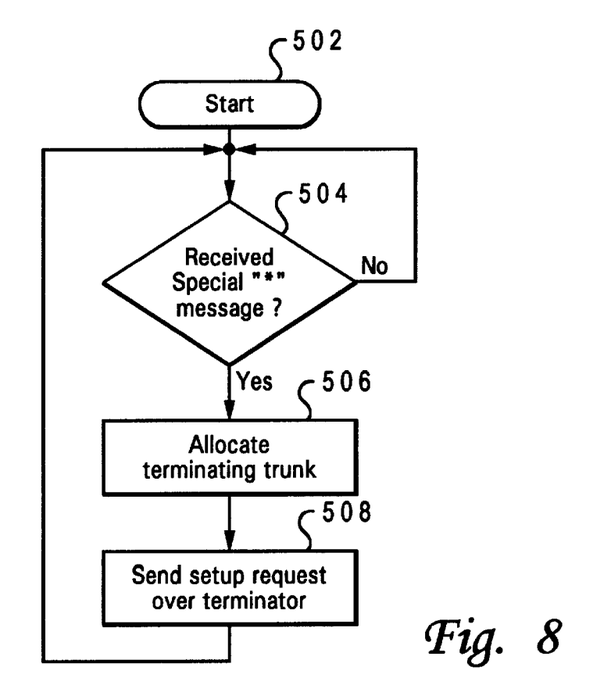
FIG. 8 is a chart depicting the logic flow when the edge switch receives a particular message in accordance with one embodiment of the invention.
Figure 9:
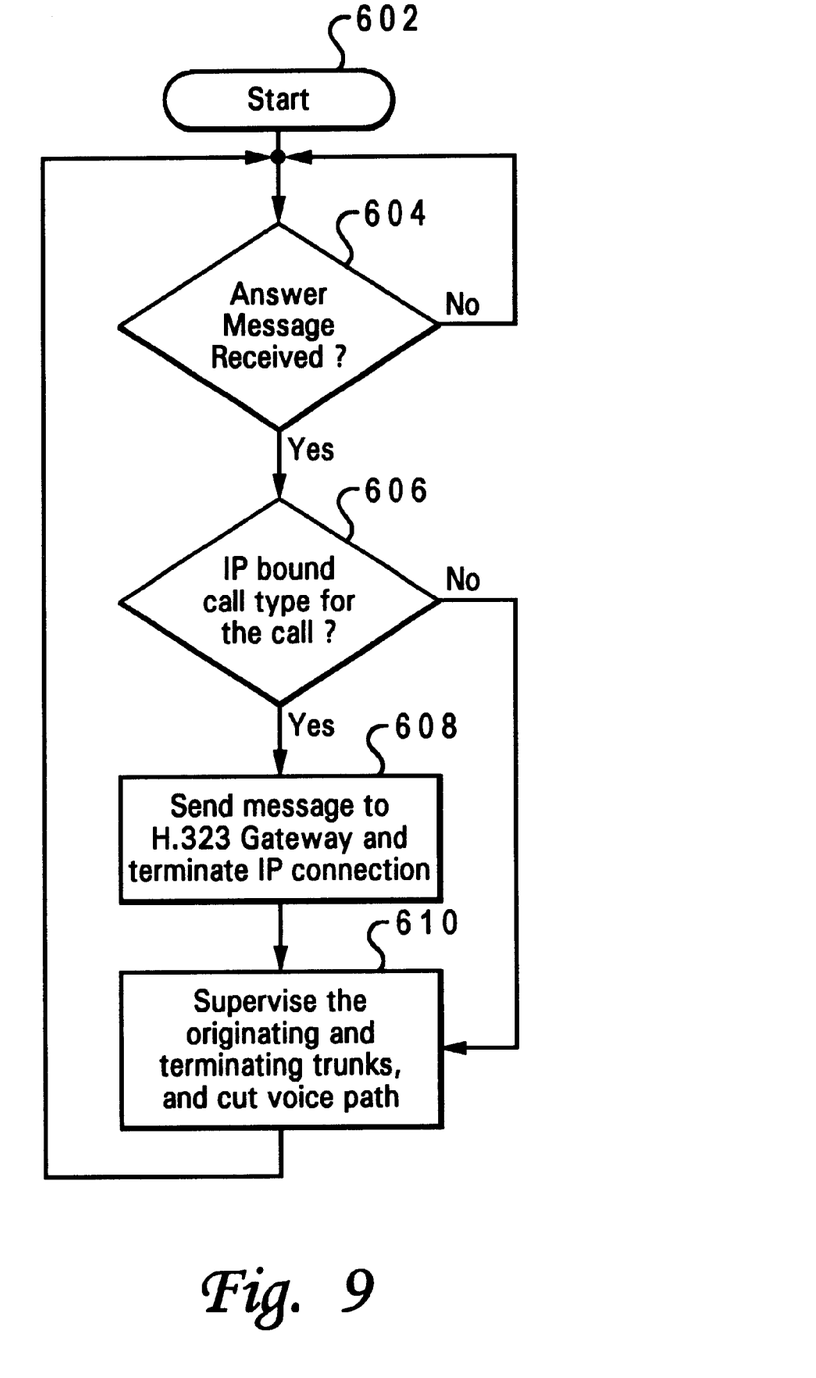
FIG. 9 is a chart depicting the logic flow when the edge switch receives the answer message in accordance with one embodiment of the invention.
Figure 10:
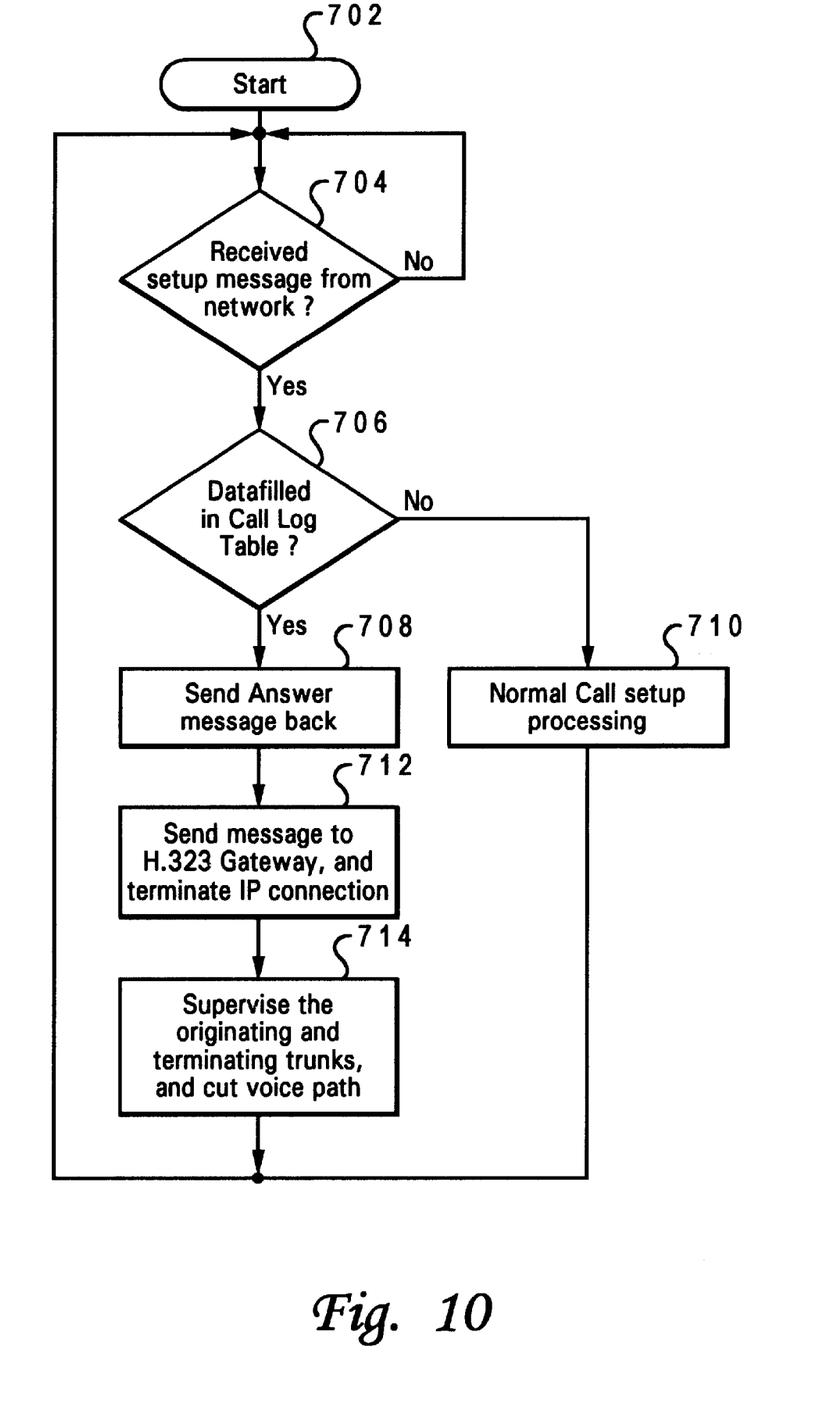
FIG. 10 is a chart depicting the logic flow when the edge switch receives the setup message from the network in accordance with one embodiment of the invention.

To switch back to the carrier network circuit, the originating and terminating edge switches should behave as FIG. 8, FIG. 9 and FIG. 10, respectively, while the network switches behave as in setting up a normal call. When the originating edge switch receives the answer message from the terminating edge switch, the switch will re-supervise the call for voice trunks and send a message to the H.323 gateway to terminate the IP connection for the call. For the terminating edge switch, after receiving a call setup request message from the network side, it will first check the in-switch call log table as illustrated in FIG. 7. An entry in the call log table matching the calling and called party number indicates that the call was connected through the IP network. Once this is ascertained, the carrier switch sends an answer message to the originating edge switch to re-supervise the call for voice trunks, and sends a message to the attached H.322 gateway to terminate the IP connection for the call.

FIG. 8 depicts the logic flow when the edge switch receives the special message to terminate the IP connection. The process begins at block 502. Once the special message is received as illustrated in block 504, the terminating trunk is allocated as illustrated as in block 506, and a setup request message is sent over the terminating trunk as illustrated in block 508.

FIG. 9 provides the actual process at the originating edge switch of terminating the IP connection, and resupervising the call over voice circuit. It begins in block 602. If an answer message is received as illustrated in block 604, a determination is made as to whether or not the call was an IP bound call type as illustrated in block 606. If the call was an IP bound call type, then a message is sent to the H.323 gateway to terminate the IP connection as illustrated in block 608. Once this is achieved, the origination and terminating trunk are supervised to establish voice path as illustrated in block 610. Note that this occurs if the call type was an IP network routed call. If, however, the call was not IP network routed as illustrated in block 606, then the process skips the messaging to terminate IP connection. The originating and terminating trunk are supervised and voice path is cut as illustrated in block 610.

FIG. 10 depicts the process which occurs when the terminating edge switch receives the setup request message from the network. The process begins in block 702. If the setup message is received from the network as illustrated in block 704, then a check is made to determine if a record of the call exists in the call log table as illustrated in block 706. If there is no record of the call in the call log table, then the normal call setup processing begins as illustrated in block 710. If however, the call log table does have data related to that call, then the answer message is sent back to the originating edge switch as illustrated in block 708. The message is sent to the destination H.323 gateway and the IP connection is terminated for the call as illustrated in 712. The origination and terminating trunks are supervised to establish the voice path as illustrated in block 714.

In one embodiment of the present invention, if the gateway detects too much packet loss during a voice call, it will send a warning message to the edge switch at the origination side. When the edge switch receives the warning message, it will reattach the digit receiver for a limited time and send a beep to the calling party to give him/her a chance to switch to circuit network. If a special digit, for example "*", is received, then the process to switch to circuit network as described in last section is activated.

Figure 11:
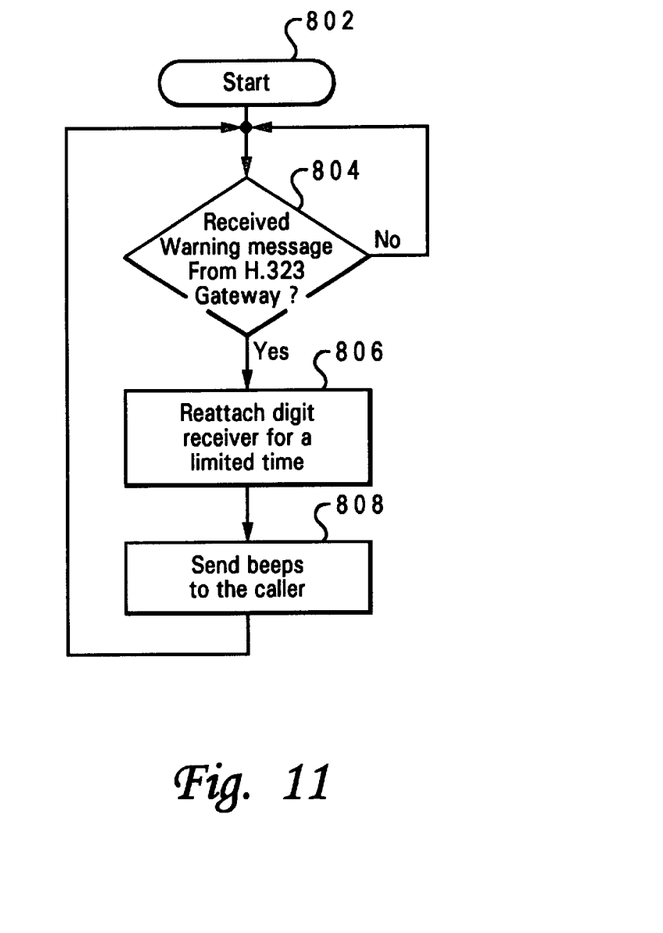
FIG. 11 is a chart depicting the logic flow when the edge switch receives a warning message from the H.323 gateway in accordance with one embodiment of the invention.

FIG. 11 depicts the process which occurs when the gateway detects too much packet loss for call routed through the IP network. The process starts in block 802. H.323 gateway receives a warning message due to significant packet loss as illustrated in block 804. In the preferred embodiment, this prompts the reattachment of the digit receiver for a limited time as illustrated in block 806 to provide the caller with the option to terminate the IP routing and reroute via carrier network. Contemporaneously with reattaching the digit receiver, a signal is transmitted to the caller as illustrated in block 808 to inform the caller he or she may terminate the IP connection and reselect the carrier network.

The description of the preferred embodiment of the present invention has been presented for purposes of illustration and description, but is not intended to be exhaustive or limit the invention in the form disclosed. For example, although in the depicted examples in FIGS. 1, 2, 3A and 3B, the processes of the present invention are implemented in a switch, the present invention also may be implemented in other data processing systems. For example, the processes of the present invention may be implemented within a computer having a connection to a switch in which the computer provides the logic and commands to the switch to provide the processes utilized to determine post call charge information for a customer after termination of a call, which in the depicted examples are a long distance or cellular phone call. Many modifications and variations will be apparent to those of ordinary skill in the art. The embodiment was chosen and described in order to best explain the principles of the invention and the practical application to enable others of ordinary skill in the art to understand the invention for various embodiments with various as are suited to the particular use contemplated.

What is claimed is:

1. A method for dynamically interchanging a communication routing path from an IP network to a carrier network circuit during communication between an origination unit and a destination unit, said method comprising the steps of:
    establishing a user code which indicates a caller's request that a call being placed be routed via said IP network;
    detecting entry of said code during a call setup utilizing a carrier edge switch;
    routing a call connection through said IP network when said carrier switch detects said code, wherein when said code is not detected, a call is automatically routed through said carrier network circuit; and
    dynamically switching an ongoing call to said carrier network circuit from said IP network when entry of a pre-specified code from the call origination unit is detected by the carrier edge switch.

2. The method of claim 1, wherein said routing step includes the step of seamlessly interchanging between an IP network connection and a carrier network connection after initial connection has been established by re-supervising the connection through said carrier network circuit contemporaneously with terminating said IP network connection, wherein a user does not detect interruption of said ongoing call and said interchanging occurs without termination of the call.

3. The method of claim 1, wherein said detecting step is completed via digit analysis and pretranslation.

4. The method of claim 1, wherein said routing step is carried out by a carrier connecting its switches to said IP network via H.323 nodes.

5. The method of claim 1, further comprising the steps of:
    monitoring line connection quality of said ongoing call being routed on said IP network; and
    when the line connection quality falls below a pre-set threshold level, seamlessly re-routing said call via the carrier network circuit such that said call is continued on said carrier network circuit without being interrupted and said line quality connection for said call remains above said threshold level.

6. A method for a user of telecommunication services to dynamically interchange routing paths between a carrier network circuit and the Internet for connecting to a destination, said method comprising the steps of:
    establishing a user code which marks a connection request as requesting switching/routing via an IP network;
    detecting entry of said code during a call setup utilizing a carrier switch;
    routing a call connection through said IP network when said carrier switch detects said code, wherein when said code is not detected, a call is immediately routed through standard telephone network service;
    logging all calls routed through said IP network; and
    utilizing data about the logged calls to determine mid-call features including checking for initial connection upon receipt of a user termination signal.

7. The method of claim 1, wherein said establishing step provides a lower rate structure for calls routed via said IP network versus calls routed via said carrier network circuit, and said ongoing calls continue to be routed via said IP network only if a connection quality of said IP network remains above a pre-set threshold level.

8. The method of claim 1, further comprising:
    placing data about said call routed to said Internet in an in-switch call log table that comprises source and destination numbers and a terminating trunk identifier (TID), wherein only calls routed through the IP network are logged therein; and
    determining which calls are routed via said IP network and may be switched to said carrier network circuit by checking source and destination numbers within said call log table.

9. The method of claim 1, further comprising enabling a caller, who is not satisfied with a quality of said ongoing call to arbitrarily initiate a switch to said carrier network circuit by depressing a pre-selected button on a caller's telephone during an ongoing call.

10. The method of claim 9, wherein, when a carrier edge switch receives an indication that said button has been depressed, said switch detaches the receiver from the IP network and re-allocates an associated terminating voice trunk to said carrier network circuit.

11. The method of claim 9, wherein the origination and destination units are telephones, said method further comprising:
    detecting a drop in quality of service for the ongoing call routed via the IP network;
    re-attaching the digit receiver of the caller's telephone;

signaling a caller of said telephone to select said pre-selected button to initiate re-routing of said ongoing call to said carrier network circuit;

monitoring for a selection by said caller of said pre-selected button; and initiating said re-routing when said selection is detected.

12. A system for dynamically interchanging a communication routing path from an IP network to a carrier network circuit during communication between an origination unit and a destination unit, said system comprising:

means for establishing a user code which indicates a caller's request that a call being placed be routed via said IP network;

means for detecting entry of said code during a call setup utilizing a carrier edge switch;

means for routing a call connection through said IP network when said carrier switch detects said code, wherein when said code is not detected, a call is automatically routed through said carrier network circuit; and means for dynamically switching an ongoing call to said carrier network circuit from said IP network when entry of a pre-specified code from the call origination unit is detected by the carrier edge switch.

13. The system of claim 12, wherein said routing means includes means for seamlessly interchanging between an IP network connection and a carrier network connection after initial connection has been established by resupervising the connection through said carrier network circuit contemporaneously with terminating said IP network connection, wherein a user does not detect interruption of said ongoing call and said interchanging occurs without termination of the call.

14. The system of claim 12, wherein said detecting means is completed via digit analysis and pretranslation.

15. The system of claim 12, wherein said routing means is effectuated by a carrier connecting its switches to said IP network via H.323 nodes.

16. The system of claim 12, further comprising:

means for monitoring line connection quality of said ongoing call being routed on said IP network; and means, when the line connection quality falls below a pre-set threshold level, for seamlessly re-routing said call via a carrier network circuit such that said call is continued on said carrier network circuit without being interrupted and said line quality connection remains for said call above said threshold level.

17. The system of claim 12, wherein said establishing means provides a lower rate structure for calls routed via said IP network versus calls routed via said carrier network circuit, and said ongoing calls continue to be routed via said IP network only if a connection quality of said IP network remains above a pre-set threshold level.

18. The system of claim 12, further comprising:

means for placing data about said call routed to said Internet in an in-switch call log table that comprises source and destination numbers and a terminating trunk identifier (TID), wherein only calls routed through the IP network are logged therein; and means for determining which calls are routed via said IP network and may be switched to said carrier network circuit by checking source and destination numbers within said call log table.

19. The system of claim 12, further comprising enabling a caller, who is not satisfied with a quality of said ongoing call to arbitrarily initiate a switch to said carrier network circuit by depressing a pre-selected button on a caller's telephone during an ongoing call.

20. The system of claim 19, wherein, when a carrier switch receives an indication that said button has been depressed, said switch detaches the receiver from the IP network and re-allocates an associated terminating voice trunk to said carrier network circuit.

21. The system of claim 19, further comprising:

means for detecting a drop in quality of service for the ongoing call routed via the IP network;

means for re-attaching the digit receiver of the caller's telephone;

means for signaling a caller of said telephone to select said pre-selected button to initiate re-routing of said ongoing call to said carrier network circuit;

means for monitoring for a selection by said caller of said pre-selected button; and means for initiating said re-routing when said selection is detected.

22. A system for a user of telecommunication services to dynamically interchange routing paths between a carrier network circuit and the Internet for connecting to a destination, said system comprising:

means for establishing a user code which marks a connection request as requesting switching/routing via an IP network;

means for detecting entry of said code during a call setup utilizing a carrier switch;

means for routing a call connection through said IP network when said carrier switch detects said code, wherein when said code is not detected, a call is immediately routed through standard telephone network service;

means for logging all calls through said IP network in a table; and means for utilizing said table to determine mid-call features including checking for initial connection upon receipt of user termination signal.

23. A computer program product for permitting a user of telecommunication services to dynamically interchange routing paths between a carrier network circuit and the Internet for connecting to a destination comprising program instructions in a computer readable medium for:

allocating a user code which marks a connection request as requesting switching/routing via an IP network;

detecting said code utilizing a carrier switch; and routing connections through said IP network when said carrier switch detects said code and logging all calls through said IP network and utilizing said logging to determine mid-call features including checking for initial connection upon receipt of user termination signal.

24. The computer program product of claim 23, said program instructions for said routing includes further program instructions for selecting a carrier network circuit after connection to said IP network has been established based on user input.

25. The computer program product of claim 23, wherein said program instructions for said routing includes program instructions for interchanging between an IP network connection and a carrier network connection after initial connection has been established by resupervising the connection through said carrier network circuit contemporaneously with terminating said IP network connection.

26. The computer program product of claim 23, wherein said program instructions for detecting includes program instructions wherein said detecting utilizes digit analysis and pretranslation.

27. The computer program product of claim 23, wherein said program instructions for said routing includes program instructions whereby said routing is effectuated by a carrier connecting its switches to said IP network via H.323 nodes.

28. The computer program product of claim 23, further comprising program instructions for:
   monitoring of line quality by IP monitor;
   terminating an IP network connection; and
   reconnecting via a carrier network circuit when said monitor registers a predetermined drop in connection quality.

29. The computer program product of claim 23, wherein said program instructions for said routing effectuates a lower rate structure for users of said IP network in long distance and international calling.

* * * * *